(12) United States Patent
Solomon et al.

(10) Patent No.: US 6,973,524 B1
(45) Date of Patent: Dec. 6, 2005

(54) INTERFACE FOR BUS INDEPENDENT CORE

(75) Inventors: Richard L. Solomon, Colorado Springs, CO (US); Timothy E. Hoglund, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 512 days.

(21) Appl. No.: 09/736,883

(22) Filed: Dec. 14, 2000

(51) Int. Cl.[7] .............................................. G06F 13/14
(52) U.S. Cl. .......................... 710/305; 710/20; 710/39
(58) Field of Search ............................ 710/5–7, 20, 21, 710/39, 112, 305, 306, 309–311, 313–315

(56) References Cited

U.S. PATENT DOCUMENTS

| | | | | |
|---|---|---|---|---|
| 5,745,732 A | * | 4/1998 | Cherukuri et al. ............ | 711/168 |
| 5,875,343 A | * | 2/1999 | Binford et al. ............... | 710/263 |
| 5,905,876 A | * | 5/1999 | Pawlowski et al. .......... | 710/112 |
| 5,991,843 A | * | 11/1999 | Porterfield et al. .......... | 710/112 |
| 6,061,754 A | * | 5/2000 | Cepulis et al. ............... | 710/312 |
| 6,067,071 A | * | 5/2000 | Kotha et al. .................. | 345/698 |
| 6,088,740 A | * | 7/2000 | Ghaffari et al. ............... | 710/5 |
| 6,170,030 B1 | * | 1/2001 | Bell .............................. | 710/310 |
| 6,233,628 B1 | * | 5/2001 | Salmonsen et al. ........... | 710/27 |
| 6,266,778 B1 | * | 7/2001 | Bell .............................. | 713/400 |
| 6,449,677 B1 | * | 9/2002 | Olarig et al. ................. | 710/305 |
| 6,490,644 B1 | * | 12/2002 | Hyde et al. .................. | 710/125 |
| 6,564,271 B2 | * | 5/2003 | Micalizzi et al. ............. | 710/39 |
| 6,578,096 B1 | * | 6/2003 | Steinmetz et al. ........... | 710/105 |
| 6,631,437 B1 | * | 10/2003 | Callison et al. ............. | 710/313 |
| 2002/0083256 A1 | * | 6/2002 | Pannell ....................... | 710/306 |

FOREIGN PATENT DOCUMENTS

EP 0486230 A1 * 11/1991 ........... G06F 15/16

* cited by examiner

*Primary Examiner*—Tim Vo
*Assistant Examiner*—Trisha Vu
(74) *Attorney, Agent, or Firm*—LSI Logic Corporation

(57) ABSTRACT

The present invention is directed to an interface. An interface system suitable for coupling a first bus interface controller with a second bus interface controller includes a first bus interface controller and a second bus interface controller in which the second bus interface controller is coupled to the first bus interface controller via an interface. The interface includes a command queuing interface suitable for enqueueing a transaction, a command completion interface suitable for reporting transaction completion and a data transfer interface suitable for transferring data.

29 Claims, 3 Drawing Sheets

INTERFACE FOR BUS INDEPENDENT CORE

FIELD OF THE INVENTION

The present invention generally relates to the field of bus controllers, and particularly to an interface for a bus independent core.

BACKGROUND OF THE INVENTION

Information handling systems, such as desktop computers, servers, network appliances, and the like, are driving the expansion of the modern economy. Because information handling systems are performance driven, system throughput is vital for differentiating products, such as products that exchange massive amounts of information, both internally and externally, with storage devices, network interface cards, and the like. Therefore, increases in the ability to transfer data both within the system itself and transfer data over a network may afford competitive advantages for systems able to provide these advances.

Once such problem is the transfer of data within the information handling system itself. Due to rapid advancements in processor speed, storage device access times, network speed, and the like, the bandwidth available within the system has steadily eroded. Thus, advancements in the ability of a system to input and output data are at the cutting edge of information handling system development. However, development of faster bus standards has encountered some limitations, namely the dependency of the operations of internal buses to external buses. For example, bus interface controller cores often have internal interfaces, which are tightly tied to the external bus. The internal interfaces may require agents connecting to them to have knowledge of various external bus characteristics, such as disconnection points and byte alignment. Previously, changes in external bus interfaces have required redesign of numerous internal modules. Although attempts have been made at removing external bus dependence from internal interfaces, changes in external bus interfaces typically require redesign of numerous internal modules.

Therefore, it would be desirable to provide an interface for a bus independent core.

SUMMARY OF THE INVENTION

Accordingly, the present invention is directed to an interface for a bus independent core. In a first aspect of the present invention, an interface system suitable for coupling a first bus interface controller with a second bus interface controller includes a first bus interface controller and a second bus interface controller in which the second bus interface controller is coupled to the first bus interface controller via an interface. The interface includes a command queuing interface suitable for enqueueing a transaction, a command completion interface suitable for reporting transaction completion and a data transfer interface suitable for transferring data.

In a second aspect of the present invention, a method for transferring data includes enqueueing a transaction on a command queuing interface, transferring data corresponding to the transaction on a data transfer interface, and receiving notification of completion of the transfer of data corresponding to the transaction, the notification reported on a command completion interface.

In a third aspect of the present invention, an interface system suitable for coupling a first bus interface controller with a second bus interface controller includes a first bus interface controller suitable for coupling to a backend device and a second bus interface controller suitable for coupling to an internal bus of an information handling system. The second bus interface controller is coupled to the first bus interface controller via an interface. The interface includes a command queuing interface suitable for enqueueing a transaction, a command completion interface suitable for reporting transaction completion and a master data transfer interface suitable for transferring data.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
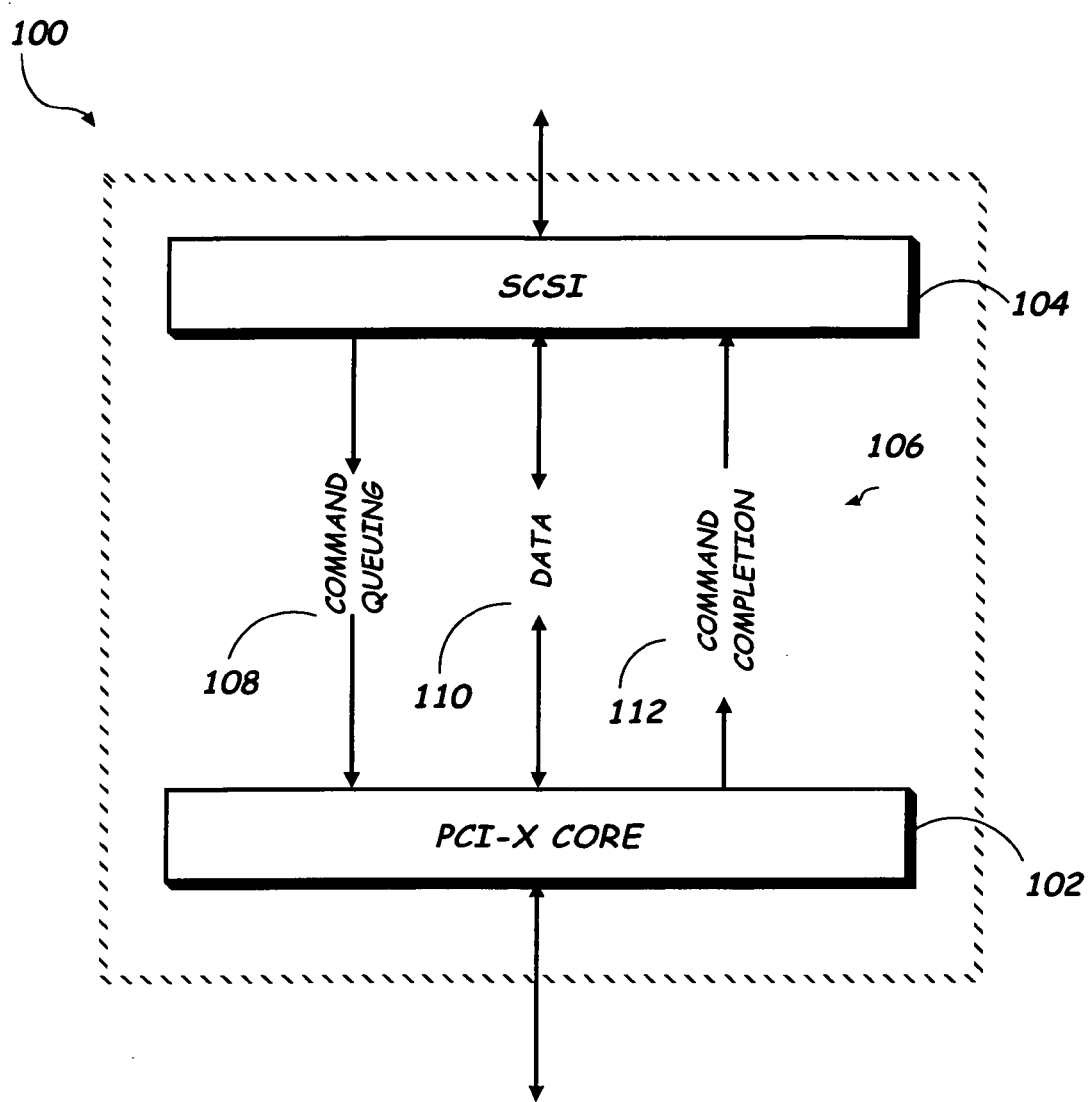
FIG. 1 is an illustration of an exemplary embodiment of the present invention wherein an interface system includes a command queuing interface, data transfer interface and a command completion interface.
Figure 2:
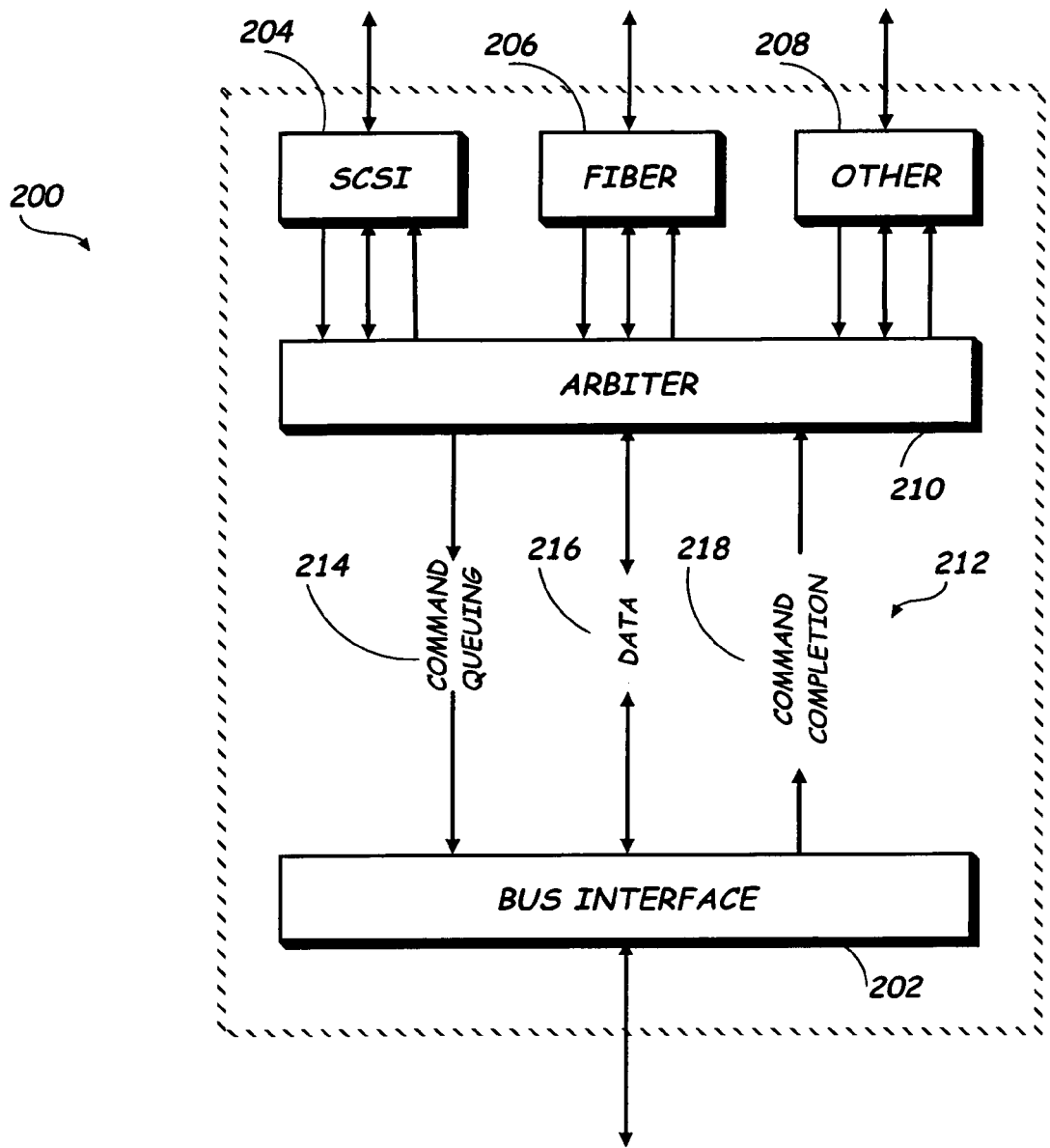
FIG. 2 is an additional illustration of an exemplary embodiment of the present invention wherein a variety of bus interfaces supported by a triple bus interface of the present invention are shown.
Figure 3:
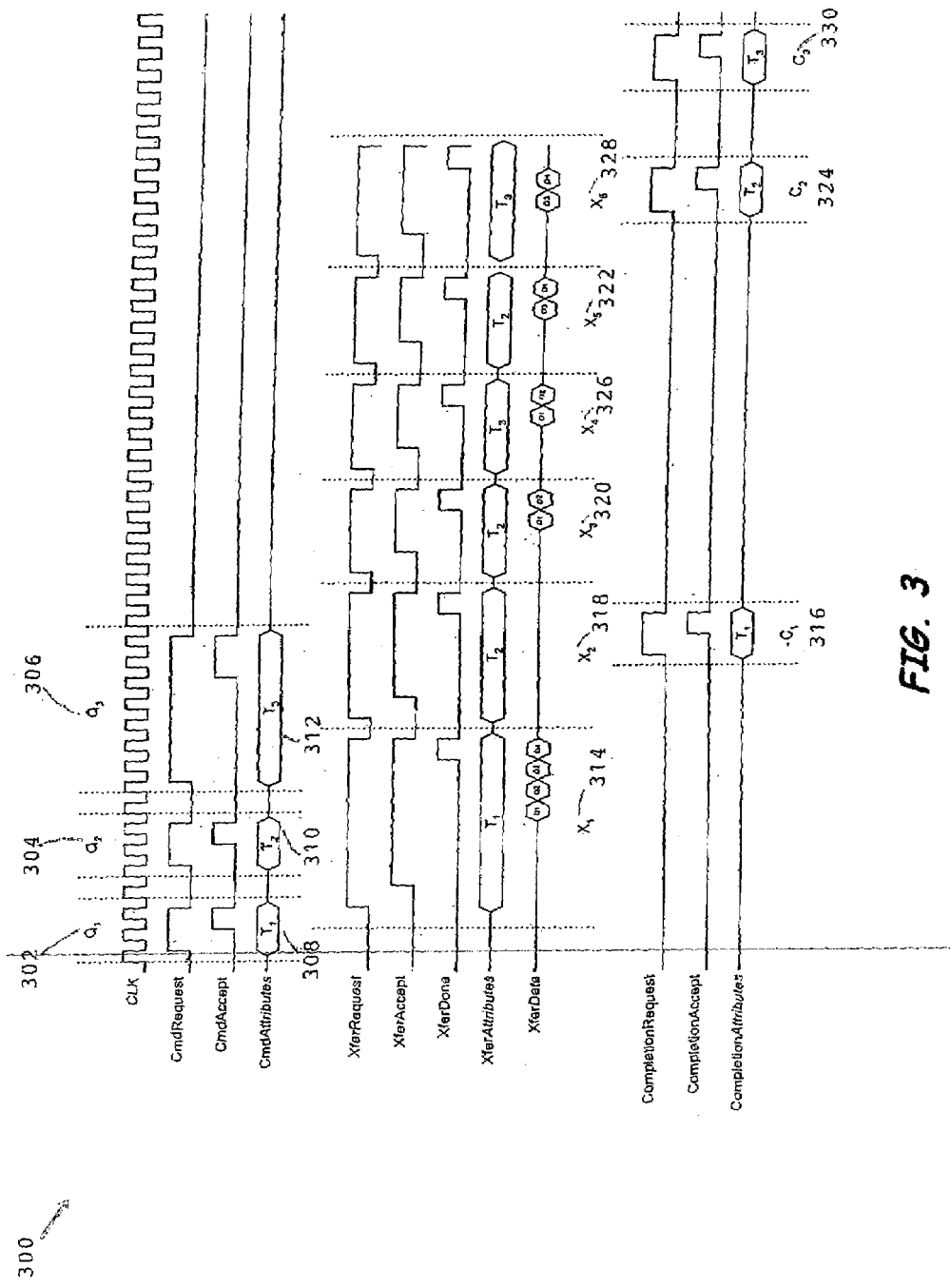
FIG. 3 is an illustration depicting an exemplary embodiment of the present invention wherein a backend device utilizes an interface of the present invention.

Reference will now be made in detail to the presently preferred embodiments of the invention, examples of which are illustrated in the accompanying drawings. Referring generally now to FIGS. 1 through 3, exemplary embodiments of the present invention are shown. The present invention is shown in conjunction with a bus suitable for operation in a Peripheral Component Interconnect (PCI) and PCI-X architectures. Although, a bus suitable for operation in both conventional PCI and PCI-X modes is described, a wide variety of bus architectures are contemplated without departing from the spirit and scope of the present invention.

Referring now to FIG. 1, an exemplary embodiment 100 of the present invention is shown wherein an interface system includes a command queuing interface, data transfer interface and a command completion interface. Typically, bus interface controllers, such as controller cores and the like, have internal interfaces which are tightly tied to an external bus. The internal interfaces may require agents connecting to them to have knowledge of various external bus characteristics, such as disconnection points and byte alignment. Thus, previously, changes in external bus interfaces have required redesign of numerous internal modules. A bus interface of the present invention provides a generic interface that would not require an extensive redesign of numerous internal modules when utilizing a different bus interface controller, thereby greatly increasing the flexibility of the bus interface system.

For example, a bus interface system 100 may include a first bus interface controller, in this instance a PCI-X core 102 coupled to a second bus interface controller, in this instance a SCSI core 104, via an interface 106. The interface 106 includes a command queuing interface 108, a data transfer interface 110 and a command completion interface 112. The command queuing interface 108 enables backend master devices to enqueue transactions. The command completion interface 112 enables a core to report transaction completion. Each exchange on the command completion interface 112 corresponds to a command enqueued on the command queuing interface 108. The data transfer interface 110 may be utilized to move data into (inbound) or out of (outbound) a backend master's buffer. Multiple transfers on the data transfer interface 110 may reference a single transaction queued on the command queuing interface 108. Thus, the command queuing interface 108, command completion interface 112 and data transfer interface 110 provide a de-coupled control/data path architecture to a backend master device. Command and control information may be exchanged on the command queuing interface 108 and command completion interface 112 while data is exchanged on the data transfer interface 110. Therefore, data for a given transaction may be moved without respect to transactions being requested on the control bus.

Referring now to FIG. 2, an exemplary embodiment of the present invention is shown wherein a variety of bus interfaces are supported by a triple bus interface of the present invention. A bus interface system 200 may include a first bus interface 202, such as to a PCI bus, PCI-X bus, and the like, and a variety of additional bus interfaces, such as a SCSI interface 204, fiber interface 206, or other interface 208 as contemplated by a person of ordinary skill in the art. An arbiter 210 is provided for arbitration of commands. For example, the arbiter 210 may resolve competing demands for the interface. This may be accomplished by intercepting the commands from the first bus interface 202 and the variety of other bus interfaces provided 204, 206, and 208. Preferably, only commands are intercepted, since the other data, such as completion and data includes ID and tag data. However, in alternative embodiments a separate interface between the bus interfaces 204, 206, and 208 and the arbiter, may be enabled as provided by the present invention. Each interface including a command queuing interface, a data transfer interface, and a command interface.

An interface 212 is included between the arbiter 210 and the first bus interface 202. The interface 212 includes a command queuing interface 214, a data transfer interface 216 and a command completion interface 218. The command queuing interface 214 enables the variety of second interface controllers 204, 206 and 208 to enqueue transactions. The command completion interface 218 enables cores to report transaction completion. Exchanges on the command completion interface 218 correspond to a command enqueued on the command queuing interface 214.

The data transfer interface 216 may be utilized to move data into (inbound) or out of (outbound) a backend master's buffer. Multiple transfers on the data transfer interface 216 may reference a single transaction queued on the command queuing interface 214. Thus, the command queuing interface 214, command completion interface 218 and data transfer interface 216 provide a de-coupled control/data path architecture to a backend master device. Command and control information may be exchanged on the command queuing interface 214 and command completion interface 218 while data is exchanged on the data transfer interface 216. Therefore, data for a given transaction may be moved from the second bus interface controller 204, 206 and 208 without respect to transactions being requested by any other controller 204, 206 & 208.

In this way, command queuing and completion are separate from each other and from the data transfer path. Multiple agents may be supported, as well as multiple commands per agent. Data transfers may occur in any order, and have no dependence on possible alignment requirements of the external bus. Commands may also complete in any order.

Referring now to FIG. 3, an exemplary embodiment of the present invention is shown wherein a backend device utilizes an interface of the present invention. Commands shown in the Figure correspond to the exemplary commands shown in the following discussion. In this example, a backend queues up three commands, $Q_1$ 302, $Q_2$ 304, and $Q_3$ 306 with attribute tags $T_1$ 308, $T_2$ 310 and $T_3$ 312. $Q_1$ 302 generates one data transfer cycle, X1 314 to move the data and one completion cycle C1 316 to acknowledge completion of the tag and signal the backend to retire tag T1. $Q_2$ 304 generates three data transfer cycles, $X_2$ 318 reflects a retry on the PCI bus without any data being moved, $X_3$ 320 moves some of the data, $X_5$ 322 moves the remaining data, and one completion cycle, $C_2$ 324 to acknowledge completion of the tag and signal the backend to retire tag $T_2$. $Q_3$ 306 generates two data transfer cycles, $X_4$ 326 moves some of the data, $X_6$ 328 moves the remaining data, and once done, a completion cycle, $C_3$ 330 acknowledges completion of the tag and signals the backend to retire tag $T_3$.

In this way, command queuing and completion are separate from each other and from the data transfer path. Multiple agents may be supported, as well as multiple commands per agent. As shown in FIG. 3, data transfers may occur in any order, and have no dependence on possible alignment requirement of the external bus. Commands may complete in any order. Addresses and counts may be to byte-resolution. Although the use of an interface with respect to a PCI bus has been discussed, it should be readily apparent to a person of ordinary skill in the art that a variety of bus architectures are contemplated by the present invention without departing from the spirit and scope thereof.

The following discussion lists exemplary commands which may be utilized to perform functions utilizing the present invention, an example of which is shown in FIG. 3. Outbound (O) refers to transaction in which data flows from a backend device to the PCI bus, and inbound (I) refers to transaction in which data flows from the PCI bus to a backend device.

Command Queuing Interface

Backend master devices enqueue transactions on this interface. The core will execute one or more transfers on the data transfer interface for each transaction queued on this interface. When the transaction is complete, a single completion status will be reported on the command completion interface.

| | | |
|---|---|---|
| CmdSysAddr[63:0] | I | Address in system memory to/from which the current transaction is directed. |
| CmdLocalAddr[31:0] | I | Address in the backend device's buffer space to/from which the current transaction is directed. |
| CmdLength[23:0] | I | Length of the current transaction. |
| CmdInbound | I | High for transactions moving data from the |

-continued

| | | |
|---|---|---|
| CmdType[1:0] | I | PCI bus to the backend device. Low for transactions moving data from the backend device to the PCI bus.<br>Identifies the address space for the current transaction: 00 = Memory, 01 = I/O, 10 = Config, 11 = Split Completion. |
| CmdFunctionId[2:0] | I | Identifier which connects transaction to a set of configuration space data. |
| CmdBackendId[3:0] | I | Fixed identifier which is unique to the current backend device. The core uses this to connect transaction data transfers to the correct backend. |
| CmdTag[4:0] | I | Identified which is unique to the current transaction. Must not be reused by the backend until the transaction has been retired. |
| CmdRequest | I | Driven by the backend to indicate that the above signals are stable and represent a desired transaction. |
| CmdAccept | O | Driven by the core to indicate that the transaction has been accepted. |

Command Completion Interface

The core reports transaction completion on this interface. Each exchange on this bus corresponds to a command enqueued on the command queuing interface.

| | | |
|---|---|---|
| CompletionFunctionId[2:0] | O | Identifier corresponding to backend device that requested the transaction which is being retired. |
| CompletionBackendId[3:0] | O | Identifier corresponding to backend device that requested the transaction which is being retired. |
| CompletionTab[4:0] | O | Identifier reporting the CmdTag from the transaction which is being retired. |
| CompletionStatus[1:0] | O | Reports the state of the transaction which is being retired:<br>00-GOOD-transaction complete without error<br>01-ERROR-a data error occurred but the transfer continued to completion<br>10-FAULT-the transaction ended with a fatal error<br>11-Reserved |
| CompletionRequest | O | Driven by the core to indicate that the above signals reflect a transaction to be retired. |
| CompletionAccept | I | Driven by the backend to indicate that it has retired the referenced transaction. |

Data Transfer Interface

The core uses this bus to move data into (inbound) or out of (outbound) a backend master's buffer. Multiple transfers on this bus may reference a single transaction queued on the command queuing interface.

| | | |
|---|---|---|
| XferLocalAddr[31:0] | O | Address in the backend device's buffer space to/from which the current data transfer is being directed. |
| XferLocalBE[7:0] | O | Active-high byte enables for the XferData busses. |
| XferOutboundData[63:0] | I | The core captures data off this bus for transfers moving data from the backend device to the PCI bus. (XferInbound is low). |
| XferInboundData[63:0] | O | The core presents data on this bus for transfers moving data from the PCI bus to the backend device. (XferInbound is high). |
| XferInbound | O | High for transfers moving data from the PCI bus to the backend device. Low for transfers moving data from the backend device to the PCI bus. |
| XferFunctionId[2:0] | O | Identifier corresponding to backend device that requested the transaction which generated the current transfer. |
| XferBackendId[3:0] | O | Identifier corresponding to backend device that requested the transaction which generated the current transfer. |
| XferTag[4:0] | O | Identifier reporting the CmdTag from the transaction which generated the current transfer. |
| XferRequest | O | Driven by the core to indicate that the above signals reflect a data transfer in progress. |
| XferAccept | I | Driven by the backend to indicate that it is ready with/for the data transfer indicated by the above signals. |
| XferDone | O | Driven by the core to indicate that the current data transfer is complete. NOTE: This signal alone DOES NOT indicate that the transaction should be retired. |

It is believed that the interface of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An interface system suitable for coupling a first bus interface controller with a second bus interface controller, comprising:
   a first bus interface controller; and
   a second bus interface controller wherein the second bus interface controller is coupled to the first bus interface controller via an interface including
   a command queuing interface including a first path suitable for enqueuing a transaction;
   a command completion interface including a second path suitable for reporting transaction completion; and
   a data transfer interface suitable for transferring data, wherein commands in the command queue include memory, input/output, configuration, and split completion commands;
   wherein the first and second paths are decoupled from the data transfer interface.

2. The interface system as described in claim 1, wherein command and control information are suitable for being exchanged on at least one of the command queuing interface and command completion interface while data is exchanged on the data transfer interface.

3. The interface system as described in claim 1, wherein data for a transaction is suitable for being moved without respect to a current transaction being requested on a control bus.

4. The interface system as described in claim 1, wherein a backend master device enqueues a transaction on the command queuing interface, at least one transfer of data is accomplished corresponding to the transaction queued on the command queuing interface, and completion status of the transaction is reported on the command completion interface.

5. The interface system as described in claim 1, wherein a plurality of transactions are queued, the transactions being completed without regard to an order the transactions are queued.

6. The interface system as described in claim 1, wherein the first bus interface controller is suitable for coupling to a backend device and the second bus interface controller is suitable for coupling to an internal bus of an information handling system.

7. The interface system as described in claim 1, wherein the first bus interface controller conforms to at least one of a US13 standard, SCSI standard, fiber standard and the second bus interface conforms to at least one of a PCI standard and PCI-X standard.

8. The interface system as described in claim 1, wherein a plurality of data transfers on the data transfer interface are executed, the plurality of data transfers corresponding to a transaction queued on the command queuing interface.

9. A method of transferring data, comprising:
enqueuing a transaction on a command queuing interface including a first path;
transferring data corresponding to the transaction on a data transfer interface; and
receiving notification of completion of the transfer of data corresponding to the transaction, the notification reported on a command completion interface including a second path;
wherein a plurality of transactions are queued, wherein the transactions are completed without regard to an order the transactions are queued.

10. The method as described in claim 9, wherein command and control information are suitable for being exchanged on at least one of the command queuing interface and command completion interface while data is exchanged on the data transfer interface.

11. The method as described in claim 9, wherein data for a transaction is suitable for being moved without respect to a current transaction being requested on a control bus.

12. The method as described in claim 9, wherein a backend master device enqueues a transaction on the command queuing interface, at least one transfer of data is accomplished corresponding to the transaction queued on the command queuing interface, and completion status of the transaction is reported on the command completion interface.

13. An interface system suitable for coupling a first bus interface controller with a second bus interface controller, comprising:
a first bus interface controller suitable for coupling to a backend device; and
a second bus interface controller suitable for coupling to an internal bus of an information handling system, wherein the second bus interface controller is coupled to the first bus interface controller via an interface including
a command queuing interface including a first path suitable for enqueuing a transaction;
a command completion interface including a second path suitable for reporting transaction completion; and
a data transfer interface suitable for transferring data, wherein the first and second bus interface controllers are cores;
wherein the first and second paths are decoupled from the data transfer interface.

14. The interface system as described in claim 13, wherein command and control information are suitable for being exchanged on at least one of the command queuing interface and command completion interface while data is exchanged on the data transfer interface.

15. The interface system as described in claim 13, wherein data for a transaction is suitable for being moved without respect to a current transaction being requested on a control bus.

16. The interface system as described in claim 13, wherein a backend master device enqueues a transaction on the command queuing interface, at least one transfer of data is accomplished corresponding to the transaction queued on the command queuing interface, and completion status of the transaction is reported on the command completion interface.

17. The interface system as described in claim 13, wherein a plurality of transactions are queued, the transaction are completed without regard to an order the transactions are queued.

18. The interface system as described in claim 13, wherein the first bus interface controller is a triple bus interface that conforms to a US13 standard, an SCSI standard, and a fiber standard and the second bus interface conforms to at least one of a PCI standard and PCI-X standard.

19. The interface system as described in claim 13, wherein a plurality of data transfers on the data transfer interface are executed, the plurality of data transfers corresponding to a transaction queued on the command queuing interface.

20. A bus interface system, comprising:
first and second bus interface controllers for coupling to at least one backend device;
an arbiter for resolving competing demands of the first and second bus interface controllers;
a third bus interface controller for coupling to an internal bus of an information handling system, wherein the third bus interface controller is coupled to the first and second bus interfaces through the arbiter via a plurality of interfaces including a command queuing interface having a first path suitable for enqueuing a transaction;
a command completion interface having a second path suitable for reporting transaction completion; and
a data transfer interface suitable for transferring data;
wherein the first and second paths are decoupled from the data transfer interface.

21. The bus interface system of claim 20, wherein command queuing and command completion have separate paths.

22. The bus interface system of claim 21, wherein multiple agents are supported.

23. The bus interface system of claim 22, wherein the first bus interface controller is Small Computer System Interface (SCSI) controller and the second bus interface controller is a fibre interface controller.

24. The bus interface system of claim 23, wherein the third bus interface controller is one of the group consisting of a Peripheral Component Interconnect (PCI) interface controller and a Peripheral Component Interconnect Extended (PCI-X) interface controller.

25. The bus interface system of claim 24, wherein commands that are processed by the bus interface system include configuration, input/output, and memory.

26. The bus interface system of claim 25, wherein the first bus interface controller is a core and the third bus interface controller is a core.

27. The bus interface system of claim 25, wherein the commands that are processed are processed through at least one transfer cycle and a completion cycle that occurs after termination of the at least one transfer cycle.

28. The bus interface system of claim 27, further comprising a fourth bus interface controller, wherein the fourth bus interface controller is coupled to the third bus interface controller through the arbiter, wherein the arbiter resolves competing demands between the first, second, and fourth bus interface controllers.

29. A bus interface system, comprising:
  a Small Computer System Interface (SCSI) controller;
  a Peripheral Component Interconnect Extended (PCI-X) interface controller, the PCI-X interface controller being implemented as a core; and
  an interface for coupling the SCSI controller and the PCI-X interface controller, the interface including
    a command queuing interface suitable for enqueuing a transaction;
    a command completion interface suitable for reporting transaction completion from the PCI interface controller core to the SCSI controller; and
    a data transfer interface suitable for transferring data;
  wherein the command queuing interface and the command completion interface are decoupled from the data transfer interface.

* * * * *